(12) United States Patent
Hart et al.

(10) Patent No.: US 7,567,822 B2
(45) Date of Patent: Jul. 28, 2009

(54) AUTOMATED CONFIGURATION OF RF WLANS VIA SELECTED SENSORS

(75) Inventors: Brian Donald Hart, Milpitas, CA (US); Timothy S. Olson, San Jose, CA (US); James Amos, North Canton, OH (US); David McClead Theobold, Akron, OH (US); Bretton Lee Douglas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 396 days.

(21) Appl. No.: 11/247,123

(22) Filed: Oct. 11, 2005

(65) Prior Publication Data

US 2007/0082677 A1    Apr. 12, 2007

(51) Int. Cl.
*H04M 1/00* (2006.01)
*H04W 24/00* (2006.01)
*H04W 4/00* (2006.01)

(52) U.S. Cl. .............. 455/562.1; 455/456.1; 455/456.5; 455/422.1; 455/575.7; 455/82; 370/338; 370/328; 370/310; 370/310.2

(58) Field of Classification Search .............. 455/456.1, 455/456.5, 404.2, 561, 562.1, 422.1
See application file for complete search history.

(56) References Cited

U.S. PATENT DOCUMENTS

| 6,075,499 | A  | * | 6/2000 | Edwards et al. ............. 343/882 |
| 6,442,507 | B1 |   | 8/2002 | Skidmore et al. |
| 7,054,627 | B1 | * | 5/2006 | Hillman ................... 455/422.1 |
| 7,209,745 | B1 | * | 4/2007 | Sebastian et al. ............ 455/447 |
| 2003/0091010 | A1 | * | 5/2003 | Garahi et al. ............... 370/338 |
| 2003/0181163 | A1 | * | 9/2003 | Ofuji et al. ..................... 455/25 |
| 2004/0043765 | A1 | * | 3/2004 | Tolhurst .................. 455/422.1 |
| 2004/0106436 | A1 | * | 6/2004 | Ochi et al. ............... 455/562.1 |
| 2004/0167958 | A1 | * | 8/2004 | Stewart et al. .............. 709/200 |
| 2005/0113090 | A1 | * | 5/2005 | Sharony ..................... 455/436 |
| 2006/0082010 | A1 | * | 4/2006 | Saggese et al. ............ 264/40.5 |

OTHER PUBLICATIONS

Cisco IOS Configuration Fundamentals Guide *Configuring Cisco Discovery Protocol*, pp. FC-277-FC-280.
Cisco Systems Data Shee, *Ciscoworks Wireless LAN Solution Engine 2.9*, Copyright 1992-2004, Cisco Systems, Inc. pp. 1-17.

* cited by examiner

*Primary Examiner*—Huy Q Phan
(74) *Attorney, Agent, or Firm*—Baker Botts L.L.P.

(57) ABSTRACT

In a wireless LAN (WLAN), methods, apparatuses and systems directed to facilitating configuration of a wireless network is provided. According to one implementation of the present invention, sensors are used to collect data associated with locations and other properties of access points of the wireless network. The collected data can then be used to assist in automatically configuring one or more aspects of the wireless network. In some implementations, the collected data can be used to dynamically re-configure the wireless network in real time. According to another implementation of the present invention, location computation mechanisms are used to collect data associated with the location of one or more wireless clients, and the data is used to dynamically adjust one or more radio frequency (RF) coverage maps in real time. The revised RF coverage maps can then be used to re-configure one or more operational parameters of the wireless network. Implementations of the present invention provide many advantages, such as automating the configuration of the wireless network in real time and facilitating network management decisions.

25 Claims, 8 Drawing Sheets

AUTOMATED CONFIGURATION OF RF WLANS VIA SELECTED SENSORS

CROSS-REFERENCE TO RELATED APPLICATIONS AND PATENTS

This application makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/794,842 in the name of Gregg Davi, Paul Dietrich, and Alexander H. Hills, entitled "Wireless Node Location Mechanism Responsive to Observed Propagation Characteristics of Wireless Network Infrastructure Signals;"

U.S. patent application Ser. No. 11/195,536 in the name of Brian Cox, Bruce McMurdo and Anuradha Gade, entitled "Method and System for Dynamic Assignment of Wireless LAN Access Point Identity;"

U.S. patent application Ser. No. 10/315,410 in the name of David Theobold, and entitled "Access Point with Orientation Sensor;"

U.S. patent application Ser. No. 10/982,360 in the name of Bhautik Doshi, Paul F. Dietrich and Gregg Scott Davi, and entitled "Wireless Network Management System Including Integrated Location Information;"

U.S. patent application Ser. No. 10/802,366 in the name of Paul F. Dietrich, Gregg Scott Davi and Robert J. Friday, and entitled "Wireless Node Location Mechanism Featuring Definition of Search Region to Optimize Location Computation;"

U.S. patent application Ser. No. 10/894,245 in the name of James Amos, entitled "Wireless Network Management with Antenna Control;"

U.S. patent application Ser. No. 10/407,372 in the name of Alexander H. Hills, Paul F. Dietrich and Robert J. Friday, and entitled "Dynamic Transmit Power Configuration System for Wireless Network Environments;"

U.S. patent application Ser. No. 10/981,997 in the name of Bhautik Doshi and Patrice R. Calhoun, and entitled "Methods, Apparatuses and Systems Facilitating Testing of Links to Mobile Stations in Wireless Networks;" and U.S. patent application Ser. No. 10/982,153 in the name of Robert J. Friday, Paul F. Dietrich and Gregg Scott Davi, and entitled "Raster-to-Vector Conversion Operations Adapted to Modeling of RF Propagation."

FIELD OF THE INVENTION

The present invention relates to wireless networks and, more particularly, to methods, apparatuses and systems directed to facilitating configuration of wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, the proper deployment and configuration of wireless access points in a wireless network environment becomes critical to performance and security. One problem with wireless networks is that they are complicated to configure effectively and have traditionally required wireless experts to appropriately deploy and manage. The installation of a WLAN typically involves the physical deployment of access points in one or more physical locations throughout a desired service region, the use of site surveys and/or other analysis tools to assess the radio-frequency (RF) coverage provided by the deployed access points, and the configuration of operational parameters for each access point to optimize operation of the wireless network. Furthermore, efficient operation of wireless networks usually requires regular monitoring and administration due to the dynamic nature of the RF environment in which the wireless access points operate.

Configuration of a wireless network is complicated because of the inherent attributes of RF propagation (typically in indoor environments), including multipath, interference, and other phenomena that affect signal propagation and, thus, WLAN performance. As discussed above, configuration of a wireless network involves setting, and subsequently adjusting, a variety of operational parameters. These parameters may include, for example, RF channels, frequency bands (e.g., IEEE 802.11a/b/g modes), transmit power, and receiver sensitivity.

During deployment of a wireless network, access points (APs) are physically installed in selected locations, depending on where users are expected or predicted to use their wireless devices. WLAN deployments may span hundreds to thousands of APs to provide wireless coverage and mobility services for a large user base associated with enterprises or wireless service providers offering wireless hotspots. After the APs are physically placed in their selected locations, a network administrator may then construct a model of the RF environment, including the location of walls and other obstructions, to assist in configuring one or more operational parameters for the APs. Site surveys and RF prediction can then be used to assess the expected RF coverage provided by the deployed access points. For example, the network administrator may manually conduct a site survey to assess the radio coverage and other performance attributes of the wireless infrastructure. During a site survey, the network administrator physically walks around selected locations or walk-about points with a site survey tool and determines the signal strength corresponding to each AP within the coverage area.

As discussed above, to ascertain the coverage and other performance attributes of a wireless network deployment, RF prediction can also be used to construct site-specific models of RF signal propagation in a given wireless network environment. RF predication can be used in combination with, or in lieu of, site surveys. RF prediction uses mathematical techniques, such as ray tracing, to model the effects of physical obstructions, such as walls, doors, windows, and the like, on RF signal propagation in a given environment. For example, S. Fortune, "Algorithms for Prediction of Indoor Radio Propagation," Technical Memorandum, Bell Laboratories (1998), disclose various algorithms that can be used to predict radio signal propagation. Valenzuela et al., "Indoor Propagation Prediction Accuracy and Speed Versus Number of Reflections in Image-Based 3-D Ray-Tracing," Technical Document, Bell Laboratories (1998), describe algorithms for modeling RF signal propagation in indoor environments. In addition, Rajkumar et al., "Predicting RF Coverage in Large Environments using Ray-Beam Tracing and Partitioning Tree Represented Geometry," Technical Document, AT&T Bell Laboratories (1995), also disclose methods for predicting RF signal propagation in site specific environments.

With an RF model of the environment in which a WLAN is deployed, known processes and algorithms can be used to compute a suggested set of operational parameters for the access points of the WLAN, such as channel and transmit power assignments designed to optimize coverage and reduce interference. However, in known prior art systems, the construction of an RF model of a WLAN (either by site survey or RF prediction) typically involves the manual entry of a variety of data points, such as the location of the APs within the physical environment, antenna types, antenna gain, and sometimes the orientation of the antennas corresponding to the APs. Unfortunately, manual entry of this information is inconvenient, repetitive and error-prone, especially where there are a large number of APs.

As discussed above, due to the changing nature of an RF environment (such as changing or new sources of RF interference), a WLAN typically requires constant monitoring to ensure adequate performance. To monitor the wireless network, the network administrator may perform additional site surveys to assess the performance of the WLAN and/or the accuracy of the RF model used to configure the WLAN. The administrator may then use the data collected during the site survey to fine tune or reconfigure the wireless network. The optimization of a wireless network is difficult because of all of the considerations involved. Optimization of a wireless network is time consuming not only because of the inherent attributes of RF propagation, as discussed above, but also because it is an iterative process, as the multitude of measurements may become outdated as soon as the environment changes. For example, if equipment or furniture (e.g., a file cabinet) in a building is moved, the performance of the wireless network may change. Accordingly, when configuration of the wireless network becomes outdated, a new RF model (potentially involving additional site surveys and analysis) may be required.

In light of the foregoing, a need in the art exists for methods, apparatuses, and systems that facilitate automatic configuration of wireless networks. Embodiments of the present invention substantially fulfill this need.

DESCRIPTION OF THE DRAWINGS

FIG. 1 is a simplified block diagram of the components in a wireless local area network system according to one embodiment of the present invention.

FIG. 3 is a functional block diagram illustrating the components of an access point in accordance with one embodiment of the invention.

FIG. 4 is a diagram illustrating an exemplary floor plan of a building in accordance with one implementation of the present invention.

DESCRIPTION OF PREFERRED EMBODIMENT(S)

A. Overview

The present invention provides methods, apparatuses and systems directed to facilitating the configuration of a wireless network. According to one implementation of the present invention, sensors are used to collect data associated with locations and other properties of access points of the wireless network. Some implementations reduce the need for manual entry of configuration information, such as access point location, antenna orientation and the like. The collected data can then be used to assist in automatically configuring one or more aspects of the wireless network. In some implementations, the collected data can be used to dynamically re-configure the wireless network in real time. According to another implementation of the present invention, location computation mechanisms are used to collect data associated with the location of one or more wireless clients, and the data is used to dynamically adjust one or more radio frequency (RF) coverage maps in real time. The revised RF coverage maps can then be used to re-configure one or more operational parameters of the wireless network. As discussed in more detail below, implementations of the present invention provide many advantages, such as automating the configuration of the wireless network in real time and facilitating network management decisions.

B. Exemplary Wireless Network System Architecture

B.1. Network Topology

A wireless local area network (WLAN) system according to principles of the present invention is shown in FIG. 1. In a specific embodiment of the present invention, the system 100 includes a WLAN management module 10, running on a WLAN management server 20 (also referred to herein as wireless network management server 20), a local area network (LAN) 40, a router 45, and access points (APs) 50a, 50b, 50c, 50d, 50e (collectively referred to as APs 50). As FIG. 1 illustrates, these network elements are operably connected to a network 44 via router 45. FIG. 1 illustrates one possible network environment in which the invention may operate. Network 44, in one implementation, generally refers to a computer network, such as a LAN, a WAN, etc., that includes one or more intermediate network devices (e.g., routers, switches, etc.), which allow for the transmission of messages between WLAN management server 20 and APs 50. Of course, network 44 can include a variety of network segments, transmission technologies and components, such as Ethernet links, terrestrial WAN links, satellite links, and cellular links. LAN 40 may be a LAN or LAN segment implemented by an Ethernet switch (not shown) (or an array of switches) having multiple ports to which APs 50 are connected. The APs 50 are typically connected to the switch ports via Ethernet links; however, other link layer connection protocols or communication means can be employed. Other implementations are possible. For example, although WLAN management server 10 is illustrated as being on a different LAN or LAN segment, it may be co-located with APs 50.

The APs 50 are operative to wirelessly communicate with remote wireless client devices 60a; 60b (collectively referred to as "clients" 60). In one implementation, the APs 50 implement the wireless network protocol specified in the IEEE 802.11 WLAN standard, including all amendments thereto. The APs 50 may be autonomous or so-called "fat" APs, or light-weight APs operating in connection with a wireless switch (not illustrated), as disclosed in U.S. patent application Ser. No. 10/407,584, now U.S. Pat. No. 7,212,837.

B.2. Wireless Network Management Server

Figure 2:
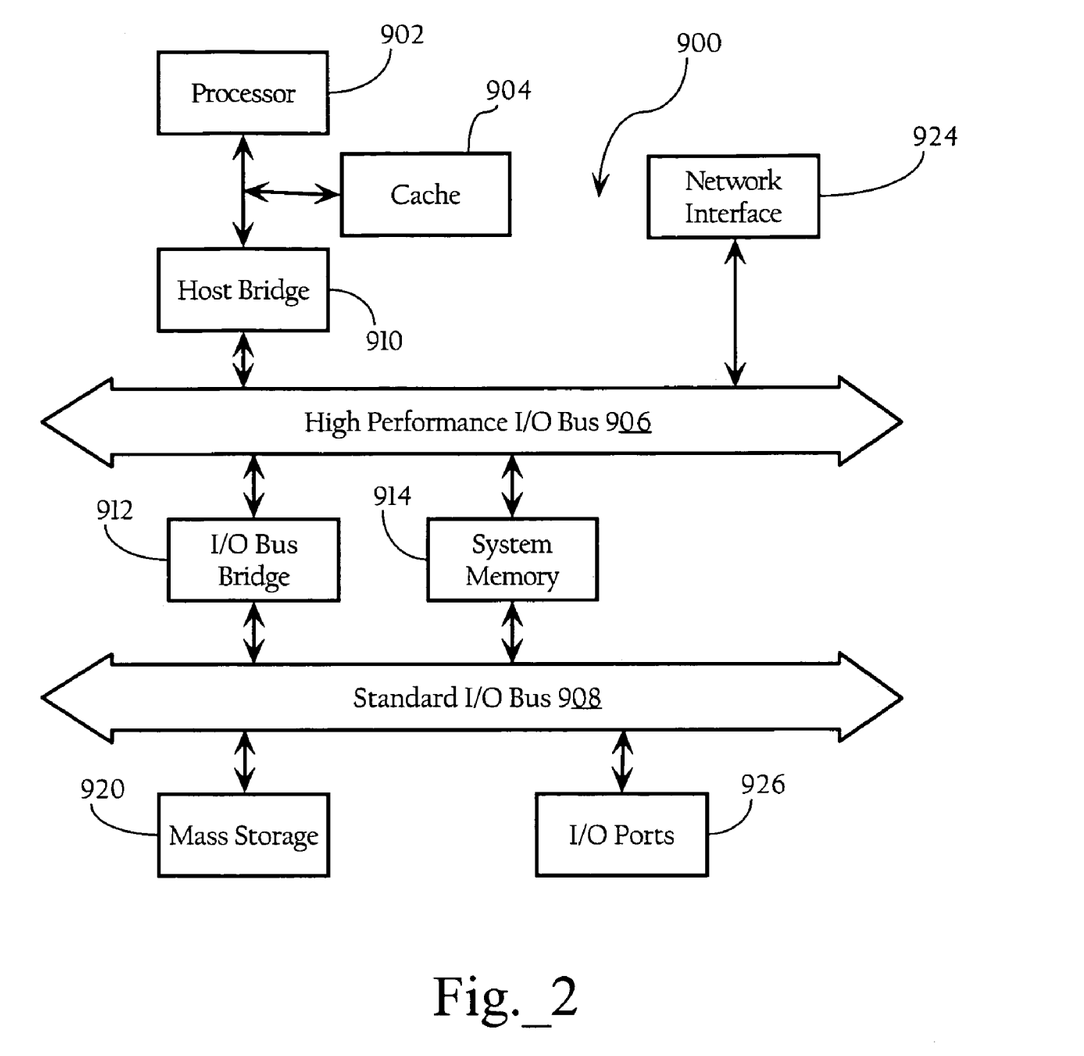
FIG. 2 is a functional block diagram illustrating the components of a wireless network management server in accordance with an embodiment of the present invention.

As FIG. 2 shows, in one implementation, WLAN management server 20 comprises a processor 902, a system memory 914, a network interface 924, and one or more software applications (including the WLAN management module 10 shown in FIG. 1) and drivers enabling the functions described herein. Furthermore, the WLAN management module 10, in one implementation, may comprise a Wireless LAN Solution Engine (WLSE) offered by Cisco Systems, Inc. of San Jose, Calif. As discussed in more detail below, WLAN management module 10, in one implementation, includes various software modules that collect sensor and other data from the access points and compute various WLAN configuration parameters. In some implementations, WLAN management module 10 employs an RF model of the WLAN deployment environment to compute one or more operational parameters for the APs 50. In some implementations, WLAN management module 10 is also operative to coordinate various operations, performed by the access points 50, related to data gathering, such as switching to a common channel, and the transmission of packets between the access points in order to perform various RF measurements. The software modules may also include HTTP or other server functionality allowing network administrators to access WLAN management module 10 from remote stations.

The present invention can be implemented on a wide variety of computer system architectures. For example, FIG. 2 illustrates, for didactic purposes, hardware system 900 having components suitable for wireless network management server 20 in accordance with an implementation of the present invention. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown) and a display device coupled to the video memory. Coupled to bus 908 are mass storage 920 and I/O ports 926. The hardware system may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interface 924 is used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the present invention may not require or include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the wireless network management server 20 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902.

An operating system manages and controls the operation of system 900, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, and the like.

B.3. Access Point

FIG. 3 is a functional block diagram illustrating the components of an AP 50 in accordance with one implementation of the present invention. An AP 50 comprises a processor 310, a memory 312, a network interface 314 (e.g., an 802.3 interface) for communication with a LAN, a wireless network interface 316 (e.g., an IEEE 802.11 WLAN interface) for wireless communication with one or more wireless clients 60, a persistent memory 318, an optional input/output (I/O) port 320 for communication with an optional global positioning system (GPS) device or equivalent 322, and optionally one or more orientation sensors 323 associated with one or more antennas 324 (e.g., omni-directional or directional antennas) corresponding to the wireless network interface 316, antenna interrogator 325 associated with the one or more antennas 324, and a system bus 308 interconnecting these components. The APs 50 also include software modules (including DHCP clients, Cisco® Discovery Protocol (CDP) modules, AP modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310.

In operation, the orientation sensors 323 detect the orientation of one or more antennas 324 of the AP. More specifically, the orientation sensors, in one implementation, are mounted directly to corresponding antennae 324, and are operative to determine the orientation of the antennae 324 with respect to magnetic "compass points," and optionally the local measure of elevation angle relative to the horizon. In another implementation, orientation sensors can be used within the AP housing to ascertain the orientation/elevation of the AP housing, with relative orientation sensors (e.g. potentiometers) indicating the orientation of the antennae 324 relative to the AP housing. Using this combination of absolute and relative sensors, the absolute orientation(s) of the antenna (s) 324 can be determined. In a third implementation, one set of absolute orientation sensors are mounted to one antenna 324, while relative orientation sensors are mounted to the AP housing and the other antennae attached to the AP housing. The orientation sensors 323 can also be used to reference the antenna 324 with respect to any local coordinate system, e.g., the floor plan of a building or other predetermined bounded area. In one implementation, the orientation sensors 323 can initially determine the orientation of the antenna 324 at the time of deployment and specifically the orientation of the antenna 324 relative to other antennas in the wireless network system. Where there are measures of relative angle between the AP housing and associated antennae, a measure of elevation angle relative to the horizon of the antenna 324 can optionally be used to ascertain the physical orientation of the AP housing, which is useful in ascertaining the orientation of the complement of antennas on the housing. In addition, the orientation sensors 323 can optionally be used to periodically confirm the orientation of the antenna 324, in the event that the antenna 324 might be moved or disturbed in an enterprise rollout.

In one implementation, the orientation sensors 323 can be a magnetic sensor located within the AP and, optionally, a one- or two-axis elevation sensor. Other antenna orientation sensors can also be used that do not derive the orientation of the antenna relative to the AP housing. A reference point is noted within the AP housing so that the radio/antenna pairs within the AP might be indexed. A two- or three-axis magnetic sensor is preferably incorporated to measure the magnetic field of the Earth relative to that reference point. In order to obtain a more precise directional resolution, the magnetic declination of the deployment location may be calculated in order to calibrate the magnetic sensor. In one implementation, this requires a (crude) absolute location, such as obtained by GPS or if coverage is unavailable, by manual-entry of the deployment address. In this way, a very sensitive and precise measurement of the directional orientation of the AP may be obtained. Optionally, one or two elevation angle (gravitational) sensors may be used to provide a local measure of elevation angle in one or two axes relative to the horizon.

A variety of implementations could be employed as orientation sensors 323, and would provide a number of respective advantages and engineering tradeoffs. Such implementations would include but not be limited to position sensing magnetic floats, Hall-effect devices, fluxgate magnetometers, dielectric fluid clinometers, and pendulum sensors. Any suitable measurement circuitry, either digital or analog, could be used to process the orientation information. For example, the sensor measurement could be processed as a subroutine in the AP to be read as any other status command to provide the orientation information. The orientation information may also be stored in a MIB for access via SNMP queries. Alternatively, the sensor measurement could be forwarded to a remote server or other component on the wireless network. In either case, the orientation information could be maintained in a central database for maintaining the directional orientations of all the APs associated with the wireless network. U.S. patent application Ser. No. 10/315,410 entitled "Access Point with Orientation Sensor", incorporated by reference herein, discloses orientation sensors that detect the orientation of an AP.

The antenna control data sensors 325 detect other properties and parameters of the one or more antennas 324 of the AP. As described more fully below, the properties and parameters may include predetermined antenna gain, antenna type (e.g., dipole, omnidirectional, patch), brand name, model number, part number, etc. U.S. patent application Ser. No. 10/894,245 entitled "Wireless Network Management with Antenna Control," incorporated by reference herein, discloses antennas that provide control data, and using antenna control data to facilitate management of a wireless network.

C. Automatic Configuration of a Wireless Network

In one implementation of the present invention, sensors are used to collect data associated with the absolute and relative locations, and other properties of APs deployed in the wireless network. More specifically, as described in further detail below, a two-phase location process is used to automatically discover AP location. In a first phase, the APs, upon start up or other event, attempt to discover their absolute geographic locations using GPS sensors, when possible. During this first phase, the APs may also poll antenna orientation and control data sensors to gather antenna orientation and control data. In a second phase, the locations of the APs relative to each other are determined using signal strength, Time of Arrival (TOA) and/or Time Difference of Arrival (TDOA) techniques, as described more fully below, or other proprietary location technologies, such as infra-red, laser, the properties of low-frequency near-field signals (Q-track), ultrasound-base location technologies, etc. In one implementation, signal strength data from the APs may be obtained using functionality available on standard 802.11 chip sets that collect signal strength data by measuring the strength of signals during receipt of wireless frames transmitted between the APs. The collected signal strength and/or location data is used to compute the geographic locations of the APs. The location data and optionally the antenna orientation data collected by the sensors may then be used to construct an RF model of the WLAN deployment environment. This RF model may be used to automatically compute RF operational parameters to dynamically configure the wireless network without requiring manual entry of various AP attributes, such as the physical location of the access points, as well as the attributes and orientation of the antennas, etc.

FIG. 4 is a diagram illustrating an exemplary floor plan of a building 400 in accordance with one implementation of the present invention. As FIG. 4 shows, the building 400 includes windows 402 positioned around the perimeter of building 400 and walls 404 positioned in various locations inside building 400. Also, APs 50 are positioned in various locations inside building 400. As described above, in one implementation, GPS devices connected to the APs 50 can be used to determine the absolute locations of the APs. However, a problem with GPS technology is that the strength of the GPS radio signals, propagating through the walls of building 400 (and potentially other obstructions), may not be sufficient to allow the GPS devices attached to the APs to reliably determine an absolute geographic location. Accordingly, the APs (e.g.,

50a, 50c) near the edge of building 400 and particularly next to windows 402 will most likely be the APs where the received GPS signals are sufficient to get an accurate absolute geographic location. As long as one absolute geographic location is determined, the known absolute location(s), or "anchor" location(s), can then be used to compute the geographic (i.e., absolute) locations of the other APs (e.g., 50b, 50d, 50e) located in the central regions of building 400 away from the windows 202 by using the relative location technologies described below. In a preferred embodiment, for unambiguous location in two dimensions, the GPS devices determine at least three non-colinear absolute locations, and in three dimensions, the GPS devices determine at least four non-coplanar locations.

C.1. Absolute Locations of Access Points

Access points 50, in one implementation, can be configured to poll various sensors and store data collected from the sensors in a data store, such as a Management Information Base (MIB), for subsequent access by WLAN management module 10 (e.g., via SNMP queries or traps). As discussed in more detail below, the sensor data may include GPS location data, antenna control data and antenna orientation data. As discussed above, various sensors may be used to automatically collect data used to facilitate computing the absolute physical location (e.g., global coordinates) of APs. Such data may be derived from ground-based radio signals or satellite radio signals. For example, known global coordinate system devices, such as global positioning system (GPS) devices or equivalents, may be utilized to facilitate computing absolute global coordinates of APs within feet and inches. That is, each AP, as illustrated in FIG. 3, may include a GPS receiver 322 that detects GPS radio signals and determines an absolute geographic location.

The use of radio signals to estimate the location of a wireless device or node is known. For example, a GPS receiver obtains geographic location information by trilaterating its position relative to satellites that transmit radio signals. The GPS receiver estimates the distance between each satellite based on the time it takes for the radio signals to travel from the satellite to the receiver (i.e., time difference of arrival (TDOA) calculations). Signal propagation time is assessed by determining the time shift required to synchronize the pseudo-random signal transmitted by the satellite and the signal received at the GPS receiver.

Figure 5:
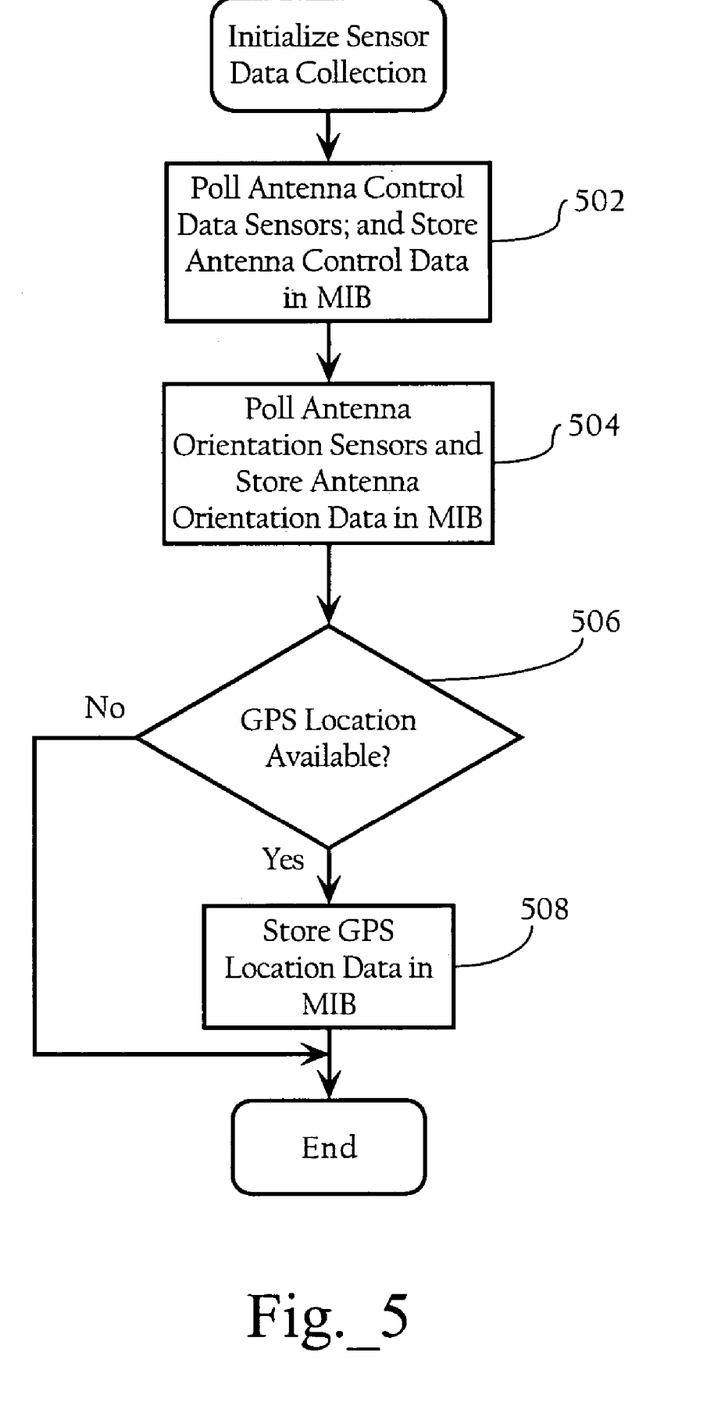
FIG. 5 is a flow chart illustrating a method implemented at an access point in accordance with one embodiment of the invention.

FIG. 5 is a flowchart illustrating a method for determining the absolute location of an AP in accordance with one implementation of the present invention. An AP performs the following process at start up (optionally, on a periodic basis after startup) and/or when the WLAN management module 10 transmits a command. Additionally, each AP may obtain a dynamic IP address and discover the WLAN management module 10 in processes performed prior to, concurrently with, or during the sensor data collection processed described herein. U.S. application Ser. No. 11/195,536 discloses one possible method that allows an AP to discover the WLAN management module 10. As FIG. 5 illustrates, the AP polls the antenna control data sensors and stores the antenna control data in the MIB (502). The AP then polls the antenna orientation sensors and stores the antenna orientation data in the MIB (504). The AP then determines if a GPS location is available by polling its associated GPS device to see if it identifies a geographic location (506). If so, the AP stores the geographic location in the MIB (508). The WLAN management module 10 may subsequently gather the absolute location via an SNMP query. If the GPS device does not return a geographic location, the AP may store a "no location" or null value in the corresponding MIB entry.

As described in detail below, the WLAN management module 10 may subsequently determine the location of at least one AP relative to other APs. For example, if the WLAN management module 10 is trying to determine the geographic location of a single, newly-added AP, and if the WLAN management module 10 does not find a GPS location in the MIB of the newly-added AP, or cannot otherwise determine an absolute location (e.g., after a predetermined number of tries or after a predetermined amount of time), the WLAN management module 10 may then determine the location of the AP relative to other APs for which absolute geographic locations are known. In another implementation, the WLAN management module 10, in a configuration mode, may direct all APs to attempt GPS location, wait a sufficient amount of time for the APs to store the locations, if any, in their respective MIBs, and then retrieve all the locations. After collecting the absolute location data, the WLAN management module 10 may then direct a desired set of APs to transmit wireless frames, and collect data relating to the signals of wireless frames transmitted by other APs in order to determine the location of the APs relative to each other. In one implementation, where GPS is not available or able to provide desired data, known manual procedures, such as manually identifying the absolute geographic location of a subset of the APs, may be implemented before the relative location process described below is initiated. Also, in another embodiment, such manual entry may follow the relative location determination procedures described below. Given that relative locations are already available (as per below), the first few APs are manually entered, then quickly other APs automatically place themselves (perhaps allowing the user to fine-tune their estimated locations).

C.2. Relative Locations of Access Points

Various sensors and mechanisms may also be used to collect data that allows for a determination of the relative location of APs (e.g., relative to other APs). As described in more detail below, the WLAN management module 10 can be configured to control some or all of the APs in a desired set of APs, coordinating their operation such that the APs transmit and receive packets and collect signal strength and/or time of arrival data associated with the data transmissions of other APs. The collected data, at each AP, may include signal strength data corresponding to neighboring APs, the arrival time of packets transmitted by neighboring APs, and the like. With this data, various relative location technologies (e.g., time difference of arrival (TDOA), time of arrival (TOA), receive signal strength indicator (RSSI), other proprietary schemes such as Q-track, etc.) can be used to compute the relative locations of the AP. TDOA and TOA are known technologies for computing the location of wireless nodes. As described more fully below, in one implementation, an AP unicasts or broadcasts packets to neighboring APs, where the differences in the transmission and receipt times (or the received signal strength) are used to determine the distances and, by trilateration, the locations, of the APs relative to each other. In one implementation, the APs 50 are configured to use a common point or segment in the signal carrying the wireless frames to which the time stamp measurements are referenced. For example, the signal reference point can be the Start of Frame Delimiter for DSSS or CCK packets according to the 802.11b/g WLAN standard, or the start of the long symbol sequence in the signal waveform of OFDM packets according to the 802.11a standard. One skilled in the art will recognize, however, that suitable reference points will depend on the wireless standard and the corresponding physical layer attributes of the wireless frames.

Figure 6:
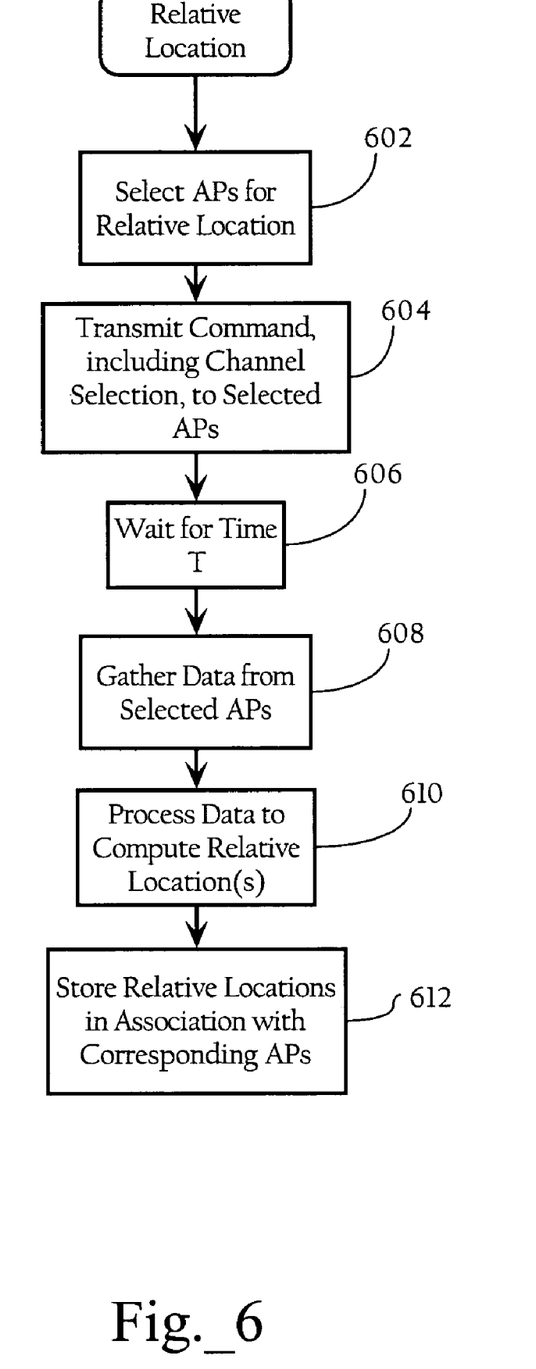
FIG. 6 is a flow chart illustrating a method for determining the relative location of one or more access points in accordance with one embodiment of the invention.

The wireless frames transmitted by the APs can include time stamps and sequence numbers to facilitate correlation and time of arrival measurements of the frames as received by the neighboring APs. As described more fully below, in one implementation, an AP transmits packets to neighboring APs, where resulting signal strength information associated with receipt of a frame is used to determine the locations of the APs relative to each other. The collection of receive signal strength (RSSI) data is a standard-part of 802.11 chip sets. U.S. patent application Ser. No. 10/794,842 incorporated by reference herein, discloses how RSSI data can be used to locate wireless nodes. As FIG. 6 illustrates, WLAN management module 10 can cause the APs to transmit/broadcast wireless frames in a coordinated fashion to allow neighboring APs to collect data (e.g., TDOA, TOA, and/or signal strength data). As described in detail below, these location technologies, individually or in combination, are used to compute relative locations of APs, by estimating relative distances and using trilateration. The relative location data can be used in combination with available absolute location data to compute the absolute location of access points, where the GPS or other location sensor was unable to provide absolute location data. For example (and referring to FIG. 4), with knowledge of the absolute location of APs 50a, 50c, located proximally to windows, the absolute location of AP 50d, for example, may be determined based on its location relative to AP 50a and/or 50c.

FIG. 6 is a flowchart illustrating a method for determining the relative location of an AP, in accordance with one implementation of the present invention. As FIG. 6 illustrates, the WLAN management module 10 selects APs (e.g. 50a, 50b, 50c) for determining relative locations (602) and then instructs the APs to switch to a uniform channel (e.g., a "transmit" channel) (604) to conduct a predetermined series of wireless frame transmissions. In one implementation, the selected APs can broadcast a series of packets (each including a unique sequence number and possibly a time stamp), where each non-transmitting AP can record the sequence number, the arrival time, the signal strength corresponding to the packet, and the MAC address of the transmitting AP. In one embodiment, a coarse arrival time and a waveform is stored and made available to the WLAN management module for TOA post-processing (e.g., cross-correlation or de-correlation) in order to obtain a fine arrival time. In another embodiment, the TOA post-processing is performed locally so that only a fine arrival time is made available to the WLAN management module. The collision avoidance mechanisms provided by the IEEE 802.11 protocol can be used by the APs to coordinate their packet transmissions. To support TOA location, the transmitting AP can record the sequence number and the time of packet transmission; alternatively, the transmitting AP can include the time of packet transmission in the transmitted wireless frames. All the data can then be stored in a database and transmitted to (or later read by) the WLAN management module 10. The WLAN management module 10, in one implementation, waits for a predetermined amount of time after issuing commands to the selected APs to allow time for the APs to complete the transmissions and data collection (606) and then gathers the data from the APs (608). The WLAN management module 10 then processes the results (610) to compute relative locations of the APs and stores the relative locations in association with corresponding APs (612). In another implementation, the APs can be configured to transmit the collected data to the WLAN management module 10 a threshold period of time after initiating the packet transmissions. In one implementation, the WLAN management module 10 can be configured to execute the relative location technologies on a repeated basis, during off-peak hours, to obtain accurate autocorrelation matrices needed for super-resolution techniques.

C.3. Attributes and Orientation of Antennas of Access Points

As discussed above, in addition to gathering data associated with the absolute and relative location of the APs, the WLAN management module 10, in one embodiment, also collects data associated with the attributes and orientation of each of the antennas of the APs. For example, attribute data may include properties and parameters such as antenna gain, antenna type (e.g., dipole, omnidirectional, patch), brand name, model number, part number, etc. Other data may include, for example, elevation patterns, azimuth patterns, magnetic declination, etc. In one implementation of the present invention, any combination of different attribute and orientation data may be detected in real time by sensors. For example, in one implementation, an antenna 324 may have a small microcontroller that reads back antenna attributes to that AP 50 which stores the data in a MIB. The WLAN management module 10 may then gather this information upon request or automatically as data is updated. Antenna orientation data may be collected by any one or combination of a tilt sensor, a gravity-based tilt sensor, an azimuth sensor, a digital compass, potentiometer (POT), or other orientation sensor. The collected attribute and orientation data may be stored in a database such as a MIB, which the WLAN management module 10 can later retrieve. Since each antenna or AP/antenna combination is provided with sensors to identify the antenna and its attributes and orientation, manual entry of antenna properties can be avoided. U.S. patent application Ser. No. 10/315,410, incorporated by reference herein, discloses a sensor that detects how the antenna of an AP is oriented. Further, U.S. patent application Ser. No. 10/894,245, incorporated by reference herein, discloses management of a wireless network using antennas.

C.4. Real-Time Configuration of the Wireless Network

As described above, the WLAN management module 10 uses automatically collected data (i.e., the absolute and/or relative locations of some APs, and optionally, the antenna configuration and/or orientation data), to compute the absolute geographic locations of all of the APs. In addition, with knowledge of one or more geographic location coordinates of the desired coverage area, the APs can be located relative to the physical attributes of the coverage area, such as the walls and partitions in the floor plan illustrated in FIG. 4. The WLAN management module 10 may then use the physical deployment data (i.e., location data, and optionally the antenna orientation data), as well as the physical properties of the antennas) to compute an RF model of the deployment environment and configuration data in real. For example, the collected data may be used to construct a physical model of the WLAN deployment environment. RF prediction techniques can be used in connection with the physical model to model expected RF propagation characteristics, generating RF propagation or heat maps, and compute configuration parameters for one or more of the APs. Configuration parameters may include information for optimizing transmit power and channel allocations for APs. Another benefit of the present invention is that the use of conventional site surveys can be avoided or minimized, since the wireless network can be automatically reconfigured using the data collection processes discussed above to reflect changes in the RF environment.

D. Automatic Adjustments of an RF Coverage Map

In another implementation of the present invention, location computation mechanisms are used to collect data associated with the location of one or more clients. The detected signal strength values can, as discussed in more detail below, be used to dynamically adjust one or more RF coverage maps. The revised RF coverage maps may then be used to dynamically re-configure one or more operational parameters of the wireless network. As a result, the WLAN management module 10 effectively uses clients as site survey tools to dynamically optimize and maintain the wireless network.

D.1. RF Coverage Map

RF coverage maps, also referred to as radio coverage maps or heat maps, are known. RF coverage maps are typically derived from a manual site survey, by RF prediction algorithms, or a combination of the two. In one implementation, an RF coverage map is represented as a table, or two-dimensional data array, where each element of the array represents a location bin or small region of the physical RF environment. The value of each element can represent the expected receive signal strength (given an assumed transmit power) at the location corresponding to each element or the expected signal attenuation (in dBs) at that location relative to an AP location. RF coverage maps can be maintained separately for each AP and combined as needed; however, in other implementations, RF coverage maps can include RF propagation data for all APs within the modeled region.

To define a coverage map, a network administrator configures the x- and y-coordinates corresponding to the location of the AP (and, in some implementations, the angular orientation of the AP antenna(s)) the physical region in which the AP is deployed. In one implementation, this information can be automatically configured based on the automatic data collection and location technologies discussed above. With the location of the AP within the model of the physical space, and in some implementations, other AP properties, such as antenna type, antenna orientation, radio type (e.g., 802.11a, 802.11b/g, etc.), the WLAN management module 10 may then compute an RF coverage map for the AP. That is, using an RF prediction tool, the WLAN management module 10 may process a vector model (for example) of the region to obtain a model of RF signal propagation characteristics from the defined AP location within the region corresponding to the RF coverage map. The RF coverage maps may also be derived using data obtained from a site survey.

The RF coverage maps are stored in a database and can subsequently be used to graphically display RF coverage information, or to locate wireless nodes, such as mobile stations and rogue APs. In one implementation, an RF coverage map characterizes, for a given AP, the expected signal strength, or signal attenuation, at a given location. In one implementation, an RF coverage map, for each AP, includes the signal strengths or attenuations in an N×M matrix, where N is the number of x-coordinate locations in the RF coverage map, and M is the number of y-coordinate locations in the RF coverage map. For example, in one implementation, a RF coverage map or matrix indicates the expected signal strength received by a wireless node at given locations defined in x-, and y-coordinates. In one implementation, the extent of the physical space modeled by the RF coverage maps for each AP is co-extensive with the area map of the region in which the AP is deployed. In other implementations, the RF coverage maps for the APs can extend to a boundary configured by a network administrator or determined by a signal strength threshold.

As discussed above, in one implementation, the RF physical model may be constructed using an RF prediction model of the coverage area, using mathematical techniques like ray-tracing, and the like. In one implementation, the RF prediction model can be computed for each coordinate location in a desired physical space. The estimated signal strength or attenuation information for each AP can be used to populate the RF coverage maps discussed above. If symmetry (often called "duality") is assumed between the propagation of signals between wireless nodes and the APs, the RF coverage maps for each AP can be used to estimate the location of wireless nodes by subtracting the estimated attenuation at each coordinate location from an assumed uniform transmit power for a mobile station or rogue AP. However, if the transmit power of the wireless node is assumed to be equal to the APs, then the RF coverage maps can be used without modification.

In addition, the RF coverage map database can be populated in alternative manners. The RF coverage maps can be populated with the results of a site survey, according to which a wireless transceiver is manually placed at different locations in the physical space. During the site survey, the APs operate in a transmitting mode that cycles between their respective antennas, and include an antenna identifier in transmitted frames. In one implementation, the wireless transceiver, which may be a laptop computer or other wireless device, can be configured to transmit the signal strength/antenna data back to an AP for collection by the WLAN management module 10. The RF coverage maps are initially constructed by associating the signal strength and location data in the RF coverage maps corresponding to each AP antenna. Mechanisms that allow the RF coverage maps to be updated are desirable, since the RF environment may change. As described further below, the WLAN management module 10 uses wireless clients to subsequently act as site survey tools and update the RF coverage map.

D.2. Location of a Wireless Client

Figure 7:
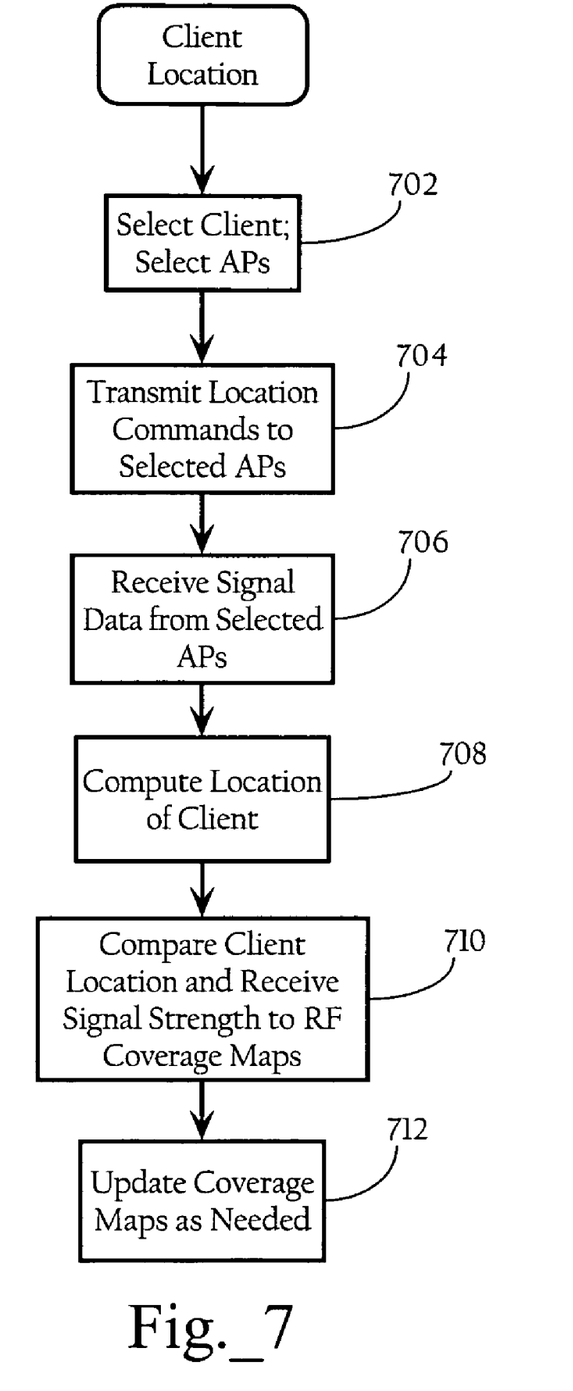
FIG. 7 is a flow chart illustrating a method for determining the relative location of a wireless client in accordance with one embodiment of the invention.

FIG. 7 is a flowchart illustrating a method for locating a client, in accordance with one implementation of the present invention. As FIG. 7 illustrates, the WLAN management module 10 first receives a selection of a wireless client, and then selects the access points that will be used to collect data used to locate that client (702). In one implementation, the WLAN management module 10 may allow a user to select an "all users" command that repeats the foregoing process for all wireless clients associated with the system at the point in time that the command was executed. To select a wireless client, WLAN management module 10 may scan the association tables of one or more access points 50. Furthermore, WLAN management module 10 may select a wireless client that is associated with an AP, but also has been idle for a threshold period of time. The selection of APs can be based on the APs that neighbor the AP to which the client is currently associated. The WLAN management module 10 then transmits a location command to the selected APs that identify the wireless client and the channel on which to operate (704). In one implementation, the AP to which the wireless client is currently associated transmits one or more test packets to the selected wireless client (e.g. 60a). A test packet causes the wireless client to transmit at least one responsive packet. All selected APs switch to the channel identified in the location command, monitor for the responsive packet(s) transmitted by the selected wireless client, and record the receive signal strength and arrival times of the responsive packets.

In one implementation, the present invention can take advantage of a commonly available software utility whereby the wireless client automatically responds to the one or more test packets transmitted by the access point. For example, a Packet Internet Groper (PING) is a small utility that sends an Internet control message protocol (ICMP) echo request to a selected host and waits for a response (ICMP ECHO). The network protocol stack implemented on the large majority of wireless clients automatically respond to the ICMP echo request with an ICMP ECHO response. As discussed above, the selected access points monitor for these responses, recording the times of arrival and the receive signal strength. As one skilled in the art will recognize, the number of test packets and their spacing is a matter of engineering or design choice.

After the WLAN management module 10 receives the signal data from the selected APs (706), it computes the location of the selected wireless client based, in one implementation, on the recorded arrival times of the responsive ICMP ECHO packets (708). In another implementation, selected local clients may be enabled with a proprietary location technology—Q-track, infra-red, laser, etc.—to provide a very reliable, accurate location estimate. In one implementation, the WLAN management module 10 may average or otherwise filter the data that results from the multiple test packets. The WLAN management module 10 may then compare the received signal strength indicators reported by the selected access points to the values stored in the corresponding RF coverage maps at the computed location (710) and update one or more of the RF coverage maps as required. That is, these RSSI values can be used to update the signal strength values stored in corresponding location bins of the coverage maps as described below.

In one implementation, the WLAN management module 10 attempts to independently locate wireless clients. In another implementation, a "dynamic model," the WLAN management module 10 assumes that the wireless client is traveling in a direction with a velocity (e.g., stopped or moving) that can change. The WLAN management module 10 may constrain the allowed wireless client locations from moment to moment and hence can filter out implausible estimates of wireless client locations.

D.3. RF Coverage Map Update

Figure 8:
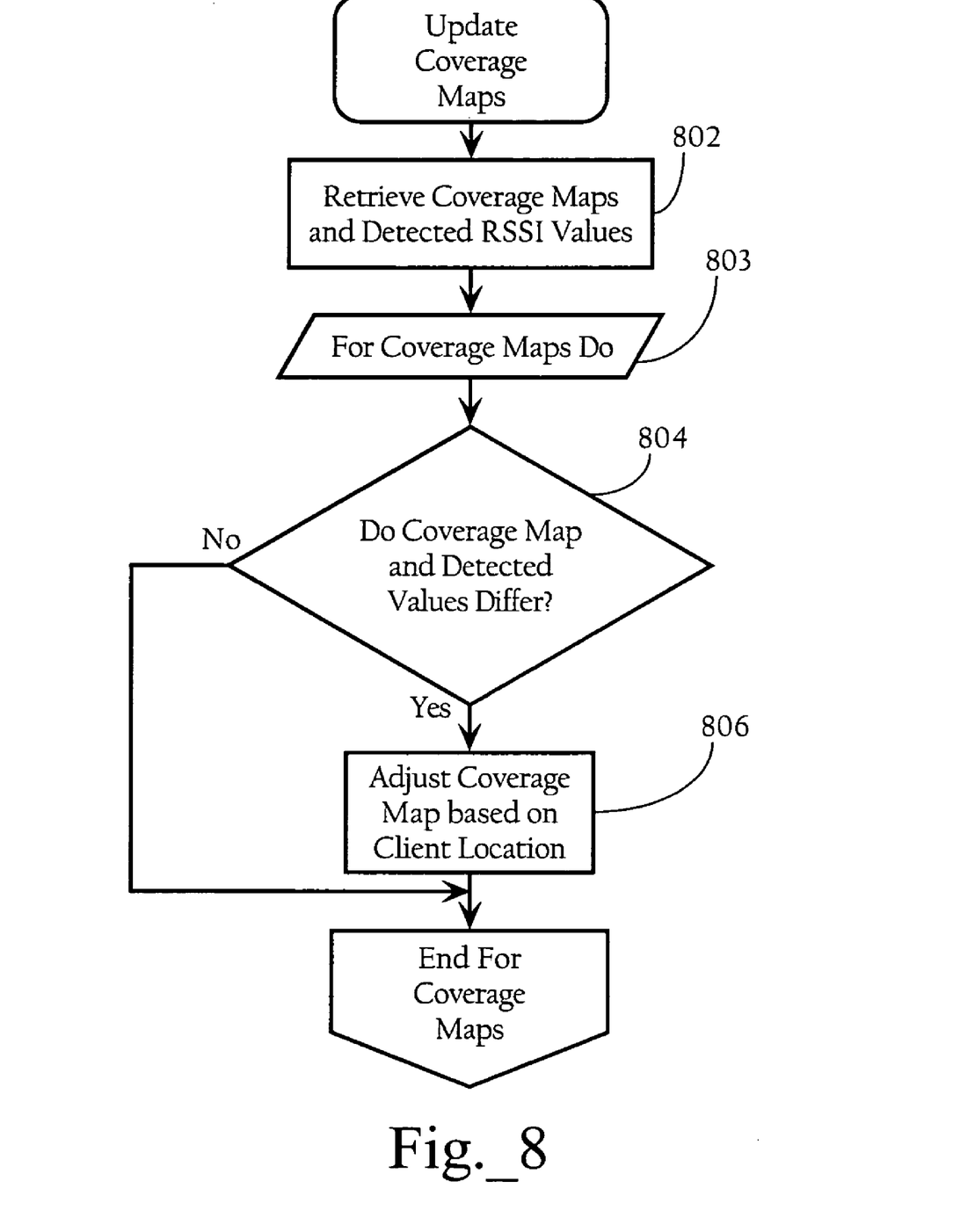
FIG. 8 is a flow chart illustrating a method for updating an RF coverage map in accordance with one embodiment of the invention.

The WLAN management module 10 may use the resulting data to refine one or more RF coverage maps. FIG. 8 is a flowchart illustrating a method for updating an existing RF coverage map, in accordance with one implementation of the present invention. As FIG. 8 illustrates, after the WLAN management module 10 computes an estimated location of the wireless client, the WLAN management module 10 retrieves the existing RF coverage maps for the selected APs (or the APs that detected wireless frames transmitted by the wireless client) and the detected receive signal strength values (802). For a given AP/coverage map pair (803), the WLAN management module 10 compares the coverage map value at the estimated location to the detected receive signal strength values (804). If the detected intensity value differs from the intensity value in the coverage map, the WLAN management module 10 adjusts the corresponding coverage map at the wireless client location (806). As discussed in more detail below, the detected value can also be used to adjust the coverage map at locations that neighbor the estimated client location. If the intensity values do not differ, the predicted intensity value is not changed. In one implementation, the coverage map and detected values must differ by a threshold margin for WLAN management module 10 to adjust the RF coverage map. Smoothing algorithms can also be used to adjust the RF coverage map. For example, the signal strength values in the coverage maps may be adjusted based on the new receive signal strength using vector algorithms, such as exponential weighted moving averages, weighted moving averages, and the like. As FIG. 8 illustrates, WLAN management module 10 can repeat this process as desired for all coverage maps corresponding to the selected APs 50 (803).

In one implementation, any adjustments in signal strength or attenuation values in a given location bin in a coverage map may be used to bias adjustments to the values in neighboring location bins, using known interpolation or smoothing in space algorithms. Whether neighboring location bins are updated based in interpolation may depend on a predetermined threshold difference in computed values or may depend on the distances between particular location bins. Propagation data stored with an RSSI-independent coordinate system (e.g., the XYZ coordinate system) can be readily updated as new RSSI data becomes available. In one embodiment of the present invention, where there is no existing RF coverage map (e.g., after an initial deployment), implementations as described above may be used to generate an initial RF coverage map, which can be updated dynamically as changes to the RF environment occur. WLAN management module 10 may then use the updated RF coverage maps to compute revised configuration parameters for one or more access points of the wireless network system. In addition, graphical representations of the updated RF coverage maps may be displayed to a network administrator to allow for a visual assessment of the RF coverage in a desired region.

The invention has been explained with reference to specific embodiments. For example, while embodiments of the present invention have been described as operating in connection with IEEE 802.11 networks, the present invention can be used in connection with any WLAN environment. In addition, while in the embodiments described above, the access points are operative to provide signal strength information for wireless node location and to provide wireless service to mobile stations, one or more of the access points can be configured to operate in a listen-only mode and used solely for location tracking. In addition, while the embodiments described above use SNMP to exchange data, other protocols can be used, such as XML, SOAP, HTTP, and the like. Other embodiments will be evident to those of ordinary skill in the art. It is therefore not intended that the invention be limited except as indicated by the appended claims.

What is claims is:

1. A method comprising:
   receiving first absolute geographic location data from each of two or more first wireless access points in a wireless network, the first absolute geographic location data from each first wireless access point indicating an absolute geographic location of the first wireless access point;
   receiving relative geographic location data from each of one or more of the first wireless access points or one or more second wireless access points in the wireless network, the relative geographic location data indicating a relative location of each of one or more of the first wireless access points and the second wireless access points with respect to each other;
   determining second absolute geographic location data indicating an absolute geographic location of each of one or more of the second wireless access points based on the first absolute geographic location data and the relative geographic location data;
   receiving antenna orientation data from each of one or more of the first wireless access points or the second wireless access points, the antenna orientation data indicating orientation of one or more antennae of the first or second wireless access point; and
   generating a radio frequency (RF) model representing RF coverage of one or more of the first or second wireless access points based at least in part on the first absolute geographic location data, the second absolute geographic location data, and the antenna orientation data.

2. The method of claim 1, wherein the relative geographic location data comprises signal data that indicates received signal strength of signals transmitted by one or more of the first or second wireless access points.

3. The method of claim 1, wherein the relative geographic location data comprises signal data that indicates times of arrival of wireless frames carried in signals transmitted by one or more of the first or second wireless access points.

4. The method of claim 1, wherein the first absolute geographic location data is determined using global positioning system (GPS) technology.

5. The method of claim 1, wherein the relative geographic location data is generated by causing a desired set of the wireless access points in the plurality of wireless access points to switch to a first operating channel, to transmit at least one wireless frame, and to detect an attribute of the signals transmitted by other wireless access points in the desired set.

6. The method of claim 1, further comprising communicating the RF model to a module that automatically determines at least one configuration parameter for the wireless network based at least in part on the RF model.

7. The method of claim 1, wherein the RF coverage of one or more of the first or second wireless access points is a collective RF coverage of one or more of the first or second wireless access points.

8. The method of claim 1, further comprising updating the first absolute geographic location data based on the relative geographic location data.

9. The method of claim 1, further comprising generating a visualization of the RF coverage based on the RF model for presentation to a user, the visualization indicating at least the absolute geographic location of each of one or more of the first or second wireless access points.

10. The method of claim 1, wherein the antenna orientation data specifies one or more of an elevation pattern, an azimuth pattern, or a magnetic declination.

11. The method of claim 1:
further comprising receiving antenna attribute data from each of one or more of the first wireless access points or the second wireless access points, the antenna attribute data indicating one or more attributes of an antenna of the associated wireless access point;
wherein generation of the RF model is further based on the antenna attribute data.

12. The method of claim 11, wherein the antenna attribute data specifies one or more of antenna gain, antenna type, antenna make, antenna model number, or antenna part number.

13. An apparatus comprising:
a network interface;
at least one processor;
a memory; and
a configuration application, physically stored in the memory, comprising instructions operable to cause the processor and the network interface to
receive first absolute geographic location data from each of two or more first wireless access points in a wireless network, the first absolute geographic location data from each first wireless access point indicating an absolute geographic location of the first wireless access point;
receive relative geographic location data from each of one or more of the first wireless access points or one or more second wireless access points in the wireless network, the relative geographic location data indicating a relative location of each of one or more of the first wireless access points and the second wireless access points with respect to each other;
determine second absolute geographic location data indicating an absolute geographic location of each of one or more of the second wireless access points based on the first absolute geographic location data and the relative geographic location data;
receive antenna orientation data from each of one or more of the first wireless access points or the second wireless access points, the antenna orientation data indicating orientation of one or more antennae of the first or second wireless access point; and
generate a radio frequency (RF) model representing RF coverage of one or more of the first or second wireless access points based at least in part on the first absolute geographic location data, the second absolute geographic location data, and the antenna orientation data.

14. The apparatus of claim 13, wherein the relative geographic location data comprises signal data that indicates received signal strength of signals transmitted by one or more of the first or second wireless access points.

15. The apparatus of claim 13, wherein the relative geographic location data comprises signal data that indicates times of arrival of wireless frames carried in signals transmitted by one or more of the first or second wireless access points.

16. The apparatus of claim 13, wherein the first absolute geographic location data is determined using global positioning system (GPS) technology.

17. The apparatus of claim 13, wherein the relative geographic location data is generated by causing a desired set of the wireless access points in the plurality of wireless access points to switch to a first operating channel, to transmit at least one wireless frame, and to detect an attribute of the signals transmitted by other wireless access points in the desired set.

18. The apparatus of claim 13, wherein the configuration application further comprises instructions operable to cause the processor and the network interface to communicate the RF model to a module that automatically determines at least one configuration parameter for the wireless network based at least in part on the absolute geographic locations of the wireless access points.

19. The apparatus of claim 13, wherein the RF coverage of one or more of the first or second wireless access points is a collective RF coverage of one or more of the first or second wireless access points.

20. The apparatus of claim 13, wherein the configuration application further comprises instructions operable to cause the processor and the network interface to update the first absolute geographic location data based on the relative geographic location data.

21. The apparatus of claim 13, wherein the configuration application further comprises instructions operable to cause the processor and the network interface to generate a visualization of the RF coverage based on the RF model for presentation to a user, the visualization indicating at least the absolute geographic location of each of one or more of the first or second wireless access points.

22. The apparatus of claim 13, wherein the antenna orientation data specifies one or more of an elevation pattern, an azimuth pattern, or a magnetic declination.

23. The apparatus of claim 13, wherein:
the configuration application further comprises instructions operable to cause the processor and the network interface to receive antenna attribute data from each of one or more of the first wireless access points or the second wireless access points, the antenna attribute data indicating one or more attributes of an antenna of the associated wireless access point; and generation of the RF model is further based on the antenna attribute data.

24. The apparatus of claim 23, wherein the antenna attribute data specifies one or more of antenna gain, antenna type, antenna make, antenna model number, or antenna part number.

25. An apparatus comprising:

means for receiving first absolute geographic location data from each of two or more first wireless access points in a wireless network, the first absolute geographic location data from each first wireless access point indicating an absolute geographic location of the first wireless access point;

means for receiving relative geographic location data from each of one or more of the first wireless access points or one or more second wireless access points in the wireless network, the relative geographic location data indicating a relative location of each of one or more of the first wireless access points and the second wireless access points with respect to each other;

means for determining second absolute geographic location data indicating an absolute geographic location of each of one or more of the second wireless access points based on the first absolute geographic location data and the relative geographic location data;

means for receiving antenna orientation data from each of one or more of the first wireless access points or the second wireless access points, the antenna orientation data indicating orientation of one or more antennae of the first or second wireless access point; and means for generating a radio frequency (RF) model representing RF coverage of one or more of the first or second wireless access points based at least in part on the first absolute geographic location data, the second absolute geographic location data, and the antenna orientation data.

* * * * *